United States Patent
Schiller (10) Patent No.: US 7,587,067 B1
(45) Date of Patent: Sep. 8, 2009

(54) METHOD AND SYSTEM FOR MONITORING INDIVIDUALS

(75) Inventor: Michael Schiller, Laguna Niguel, CA (US)

(73) Assignee: 50, LLC, Laguna Niguel, CA (US)

( * ) Notice: Subject to any disclaimer, the term of this patent is extended or adjusted under 35 U.S.C. 154(b) by 557 days.

(21) Appl. No.: 10/888,616

(22) Filed: Jul. 9, 2004

(51) Int. Cl.
*G06K 9/00* (2006.01)
*G08B 23/00* (2006.01)

(52) U.S. Cl. ..................... 382/116; 340/573.1
(58) Field of Classification Search ............. 382/116
See application file for complete search history.

(56) References Cited

U.S. PATENT DOCUMENTS

| | | | | |
|---|---|---|---|---|
| 4,952,928 A | * | 8/1990 | Carroll et al. | 340/10.41 |
| 5,537,102 A | * | 7/1996 | Pinnow | 340/5.8 |
| 5,731,757 A | * | 3/1998 | Layson, Jr. | 340/573.1 |
| 5,889,474 A | * | 3/1999 | LaDue | 340/825.49 |
| 5,995,630 A | * | 11/1999 | Borza | 380/54 |
| 6,100,806 A | * | 8/2000 | Gaukel | 340/573.4 |
| 6,505,193 B1 | * | 1/2003 | Musgrave et al. | 707/3 |
| 6,639,516 B1 | * | 10/2003 | Copley | 340/573.4 |
| 2002/0153396 A1 | * | 10/2002 | French et al. | 224/244 |
| 2002/0175211 A1 | * | 11/2002 | Dominquez et al. | 235/492 |
| 2003/0159044 A1 | * | 8/2003 | Doyle et al. | 713/176 |

* cited by examiner

*Primary Examiner*—Bhavesh M Mehta
*Assistant Examiner*—David P Rashid (57) ABSTRACT

A portable device for monitoring a user's geographic location, substantially a time of the geographic location measurement, verification status of the user's identity is provided. The portable device includes, a biometric verification module ("BVM") that verifies the user's identity and includes a scanner for capturing images of a relevant biometric area and compares the captured images with pre-defined and stored reference biometric characteristics, wherein after the comparison, the BVM indicates whether the user's identity is verified or not; and a location module that determines the portable device's location information and substantially the time of measurement; and wherein the information carrier is a memory card for storing biometric parameters, the geographic location, the substantial time of measurement of location, and the user identity flag, wherein such data is maintained in the information carrier even when the portable device is powered off.

22 Claims, 7 Drawing Sheets

FIG. 1C(ii)  FIG. 1C(iii)

METHOD AND SYSTEM FOR MONITORING INDIVIDUALS

BACKGROUND OF THE INVENTION

1. Field of the Invention

The present invention relates to remote handheld devices, and more particularly, to remote devices for monitoring individuals.

2. Background

Computing systems are used in various aspects of every day life. Such systems include desktop, notebook and laptop computers, handheld devices (personal digital assistants ("PDAs") and mobile phones. Common usage of computing systems has changed the way modern personal and professional lives are conducted. Today, a central office location can administer employees at various remote locations at a national as well as at a global level. For example, a company may be located in one city (for example, Los Angeles) in the United States, have an R & D facility in another country (for example, India) and a warehouse in another country (for example, Ireland).

Such rapid globalization and mobility of employees requires an efficient monitoring system. This is to ensure that employees are being paid for the time that they work and also discourage truancy. This is very important in professions where employees spend a lot of time away from a central office, for example, truck drivers, construction workers, marketing and sales personnel and others.

Conventional systems use fixed stations, inherently in a known location, to determine employee attendance. Such fixed stations are typically located adjacent to a company's entrance/exit doors. Among fixed stations, the prevalent biometrics system uses hand geometry to identify individuals. This system is not very accurate because more people than the actual individual may match a reference file. This system uses a small number of variables (approximately 9) that are extracted from a scanned image of the hand to distinguish one hand from another.

Also, conventional systems fail to effectively monitor individual movements because an employee can check-in and then wander around within an office complex and not be productive. Such systems also especially fail where employees' location and change in location is needed outdoors, for example, in construction, marketing, sales, and other disciplines.

Therefore, there is a need for a method and system for efficiently and accurately tracking and locating individuals.

SUMMARY OF THE INVENTION

In one aspect of the present invention, a portable device for monitoring a user's geographic location, substantially a time of the geographic location measurement, verification status of the user's identity, and storing the user's geographic location, substantial time of measurement and verification of user's identity in an information carrier and such information is accessed with an assigned certified user identity flag is provided. The portable device includes, a biometric verification module ("BVM") that verifies the user's identity and includes a scanner for capturing images of a relevant biometric area and compares the captured images with pre-defined and stored reference biometric characteristics, wherein after the comparison, the BVM indicates whether the user's identity is verified or not; and a location module that determines the portable device's location information and substantially the time of measurement; and wherein the information carrier is a memory card for storing biometric parameters, the geographic location, the substantial time of measurement of location, and the user identity flag, wherein such data is maintained in the information carrier even when the portable device is powered off.

In another aspect, the portable device is lightweight, remote and cellular phone size. The portable device also includes, an initiation module for initiating user identity verification and data collection; and a dedicated logic pathway between the biometric verification module, the location module, and the information carrier; wherein the portable device can transmit stored data from the Information Carrier to an external computing system that processes the data. The portable device can transfer the data using a Universal Serial Bus ("USB") connector on the portable device to the computing system using a USB cable, or by physically inserting the Information carrier in a slot on the computing system; or via Internet or radio means.

In yet another aspect of the present invention, the portable device further includes, a reminder module that signals the user by exciting one or more of user senses to initiate a transfer of a complete set of data entry into the Information carrier, wherein the reminder module activation can be pre-programmed. The reminder module is activated at pre-programmed intervals and/or if a current location of a user exceeds a threshold distance from an expected location. The reminder module may be programmed or re-programmed remotely.

In yet another aspect of the present invention, a method for monitoring a user using a portable device is provided. The method includes, initiating the user's identification; verifying user identification; determining geographic location and substantially a time of measurement of such location; and storing user identity, geographic location and substantially the time of measurement and a user identity flag in an information carrier, wherein such data is maintained in the information carrier even when the portable device is powered off.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 1C(i) to 1C(iii) (also referred to as FIG. 1C) show an outward view of the remote device, according to one aspect of the present invention;

DETAILED DESCRIPTION OF THE PREFERRED EMBODIMENTS

Figure 1A:
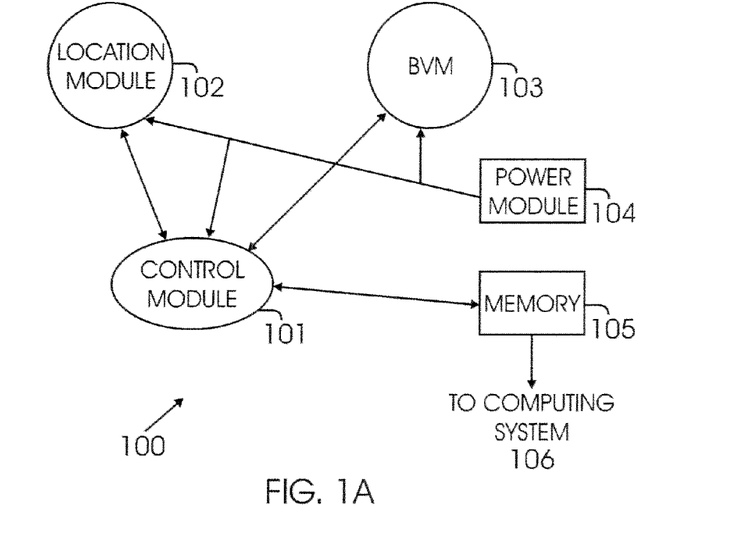
FIG. 1A shows a block diagram of a remote device according to one aspect of the present invention.
Figure 1B:
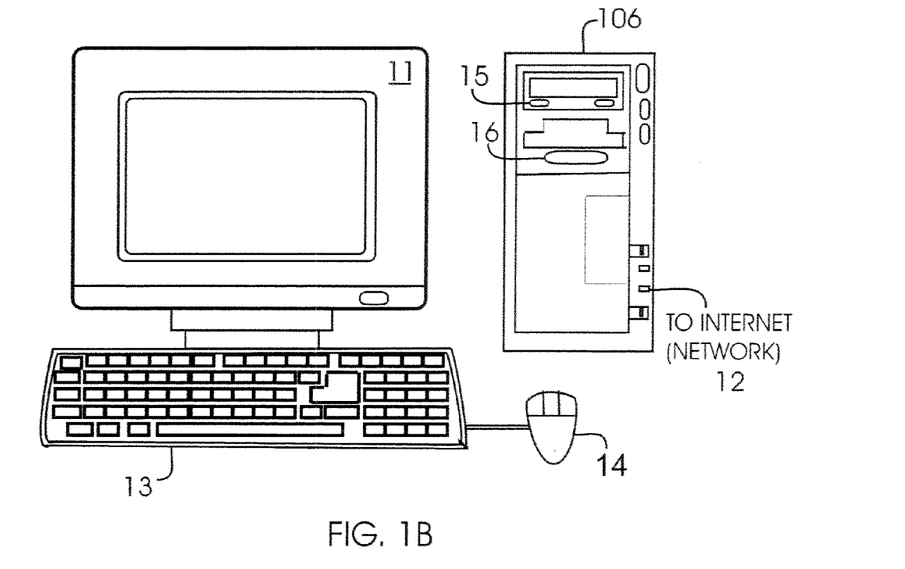
FIG. 1B shows a block diagram of a computing system that can process information received from the remote device of 1A, according to the adaptive aspects of the present invention.
Figure 1C:
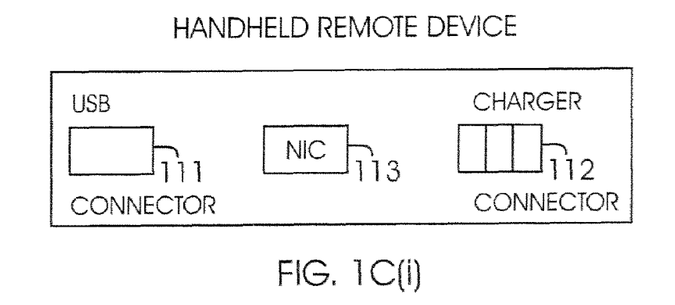
Figure 1D:
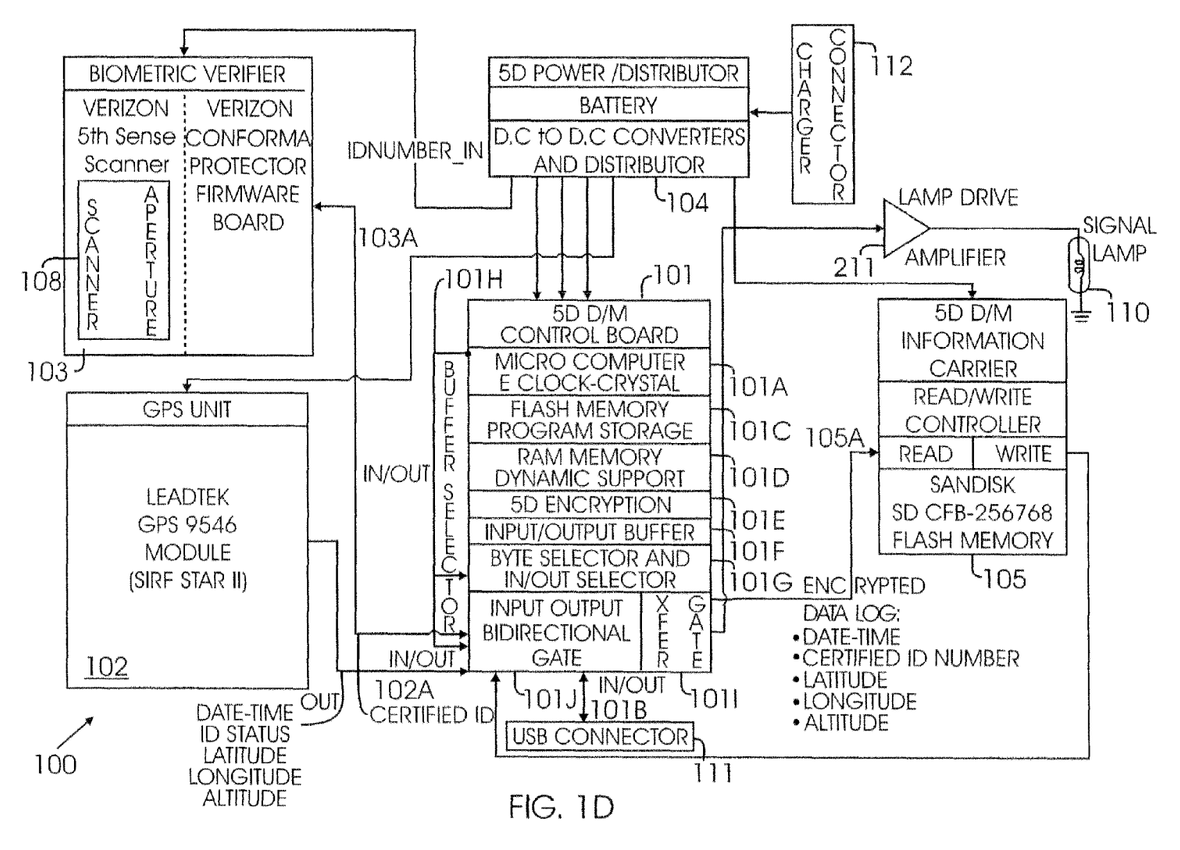
FIG. 1D shows another block diagram of the remote device, according to one aspect of the present invention.

System Overview:

In one aspect of the present invention, a mobile, handheld, preferably a cell phone size device ("remote device" 100 as shown in FIGS. 1A, 1C and 1D) is provided that is operated as a mobile device and dedicated to an individual user whose biometrics information is stored. Interaction between the user and remote device 100 is simple and does not require any third party supervision. An entry from remote device 100 includes the three coordinates of location, time of the measurement, a biometrically certified (i.e. automatically verified or not verified) identity status, and an identification number/flag of the user. The time of the measurement can be the time of measurement of location module 102 or the time of generation of identity status or any time between the two events. A stored entry of these variables is the result of one transaction cycle of Remote device 100.

Remote device 100 uses plural modules to perform the function. These modules can be separate or all integrated into an application specific integrated circuit ("ASIC"), or several programmable gate array modules. The modules include a location module 102, biometric verification module 103, a control module 101 and an information carrier 105 and a power source 104. Remote device 100 is programmable using the control module. Location module 102 (FIG. 1A) generates geographical coordinates, and the time that the coordinates are generated, while biometric verification module 103 (FIG. 1A) verifies user identity, and outputs the identity ("I.D.") status of the user. User identity, geographical information, and a user identity flag or number is stored in the information carrier (memory 105, FIG. 1A).

Location module 102 is always active. In one configuration, when an employee leaves a work-site, remote device 100 signals the user to execute an identity operation. This action initiates a transaction cycle. When the user returns to the work site, the user initiates another transaction cycle.

All data generated in an initiated transaction is immediately stored in remote device 100. Because BVM 103 is always active, there is an initiating action that stores the location and time data from BVM 103 output. In certain aspects, the key to an initiating action is dependent on the type of biometric system in BVM 103. Certain types, such those based on finger printing require the insertion of a finger onto an integral scanner. The information may also be sent to a central computing system (106, FIG. 1B) for processing the data. Using current biometric characteristics, some central computing system (for example, 106) may also verify user identity. In such a case, BVM 103 has the capability of transmitting, to computing system 106, a set of measured biometric characteristics at any given time.

Information may be transferred using a secured network or locally transferred via an interface, for example, the universal serial bus ("USB") interface. The information may be used to process payroll, evaluate user efficiency, or to decide if the data parameters underlie good security.

Outward View Description of Remote Device 100:

FIG. 1C is an outward view of a representative remote device 100 embodying the present invention. Remote device 100 includes frame 109 (as shown in FIG. 1C(ii)) with a thumb or index finger scan aperture 107 and where necessary, an initiating switch mechanism ("IM") 108 that initiates remote device 100 to verify the identity of the user (for example, an employee) using a thumb engagement, shown in 109A (FIG. 1C(iii)), that is part of a live finger biometric Verification System 103.

BVM 103 compares a user's biometric characteristics reduced from a current scan of the user's finger against stored Reference Biometric Characteristics, generally accessed by the user's ID number that is stored internal to BVM 103, and/or in flash type memory (105) outside BVM 103, but internal to remote device 100, and accessed by Control Module 101. These Reference Biometric Characteristics were reduced from enrollment scans of the user by remote device 100 and makes a decision on positive or negative verification based on the degree of match.

Remote device 100 may include a signal lamp (may also be referred to as "reminder module" or "RM") 110 that provides a visual signal (for example, a flashing light signal) to the user to actually initiate a transaction by inserting his finger into the finger aperture 107 and thereby depressing the INITIATE SWITCH/Module ("IM") 108.

In certain configurations, Remote 100 includes a low power radio receiver, whose signal can reprogram Microcomputer 101A to change the details of the operational sequence of certain functions, such as, for example, changing the time that RM 110 signals to the user to initiate a transaction. In one aspect of the present invention, the impetus to activate a transaction cycle is self generated by the user, for example, in those applications where a user's pay depends on the timely use of Remote device 100.

Depression of IM 108 causes dedicated logic on Control module 101 to sequence through operations that generate various data logs that constitute a transaction. In a more flexible programmable architecture, the Control Board logic sequence, of the various modules that form the data generated in a transaction cycle, may be implemented in CPU 101A. In addition, the flashing of signal lamp 110 may be pre-programmed to occur at random intervals or may depend upon the user's location, i.e., signal lamp 110 may flash if the user goes beyond a certain geographic limit that may be automatically calculated by work site geographic boundaries.

It is noteworthy that although a signal lamp 110 is shown in FIG. 1C, the present invention is not limited to providing a visual signal; any other technique that reminds the user of remote device 100 to initiate mechanism 108 may be used, for example, an audio speaker with a pre-recorded voice message, or a vibrating mechanism that causes remote device 100 to vibrate. It is noteworthy, that IM 110 is not intended to preclude an employee to initiate without any reminders, for example, an employee may want to be logged into a work site as soon as he arrives since the amount of his pay is affected by check-in initiation. It is also noteworthy that the adaptive aspects of the present invention envision a combination of the foregoing "reminding techniques", i.e., a combination of signal lamp 110, audio technique and the vibrating mechanism.

In one aspect of the present invention, there is a preprogrammed time when RM 110 is activated. Also, the time slot can be internally changed by reprogramming the processor 101A with a communication signal from a radio receiver, a remote computer communicating via USB connector, or the Internet.

Power module 104, in Remote device 100, provides power to the various modules. A connector 112 (FIG. 1C(i)) is used to re-charge the battery (not shown) used by power module 104.

Remote device 100 also includes a USB connector 111 (FIG. 1C(i)) that enables remote device 100 to have USB connectivity with a USB enabled host system or device. USB provides a unitary interface that allows various devices to be connected to a host system. USB enables a wide variety of peripherals to be connected in a tree-like fashion through a physical connector at the host side. USB systems will comply with the USB specification, version 2.0, published Apr. 27, 2000, which is incorporated herein by reference in its entirety.

Remote device 100 may also be provided with a network interface (NIC) 113 (FIG. 1C(i)) that enables two-way transmission of information to and from remote device 100 and an external computing system via a network (including Local Area Networks, Wide Area Networks, the Internet, wireless networks or any other network). It is noteworthy that the adaptive aspects of the present invention are not limited to any particular type of network or protocol.

Block Diagram of Remote Device 100:

FIG. 1A is a top-level block diagram of a remote device 100 with a control module 101 that is functionally coupled to a location module 102 and a biometrics verification module ("BVM") 103, according to one aspect of the present invention. BVM 103 provides an ID Status (i.e. user verified, user not verified, or no available current biometric) that is stored in remote 100 for each transaction. Remote device 100 may also operate under various operating system, e.g., Pocket PC formerly called Windows CE (Microsoft Corporation®), or Palm OS (3 Com Corporation®), or an operating system, similar to the foregoing, but proprietary in nature.

In one aspect of the present invention, microcomputer 101A, or any type of operating system, may not be required in remote device 100. In this aspect, there is no need for common formatting, beyond a digital construct, of the generated data in the Information Carrier 105. All module-to-module differences, with their related variables, in the collected data can still be processed by a remote Central Computer 106 that receives all of the raw digital data from the remote device 100 and whose internal programs are such as to recognize, and properly function, with these differences. In this case, Control Module 101 incorporates dedicated logic with a clock circuit, implemented with crystal or tuning fork, for sequencing the various steps in the generation of the digital data from the various integral modules.

Control module 101 integrates and sequences various modules of remote device 100 and may also store local reference biometric characteristics, as described below in Information Carrier 105. As an alternative, the Reference Biometric Characteristics can also be stored in BVM 103. Decisions relating to where the Reference Characteristics are stored are based on the type of BVM 103.

In another aspect of the present invention, Control module 101 provides a common communication protocol for module-to-module interaction. In this case, Control module 101 includes a micro-controller (processor 101A, FIG. 2A), or gate array or other embedded circuitry equivalent, for programming and controlling the various processes involving remote device 100.

Location module 102 determines the location of remote device 100 and is always active. A transaction cycle occurs when a sample of continuous data, at a time of initiation, is stored in the Information Carrier 105. This can occur based on a self motivation of the user, as for example in a payroll system at a construction work site, at pre-programmed intervals, or when an event occurs, for example, if a user leaves a work site location and travels beyond a certain threshold distance, as described below. BVM 103 determines the I.D. Status of the user of remote device 100, whose location needs to be verified, at a particular time or occurrence of an event, as described below.

Control module 101 transfers the generated data to Information Carrier memory 105 for storage. In one aspect, memory 105 may be removable flash memory that can be used to transfer information from remote device 100 to computing system 106, described below. In a more secure and less expensive process than that of remote transmission of data, information may be transferred from the Information Carrier via a direct USB coupling (connector 111) to computer 106. In addition, another alternative aspect, to facilitating the transfer of the generated data, is the mechanically aided transfer of information by the insertion of Information Carrier 105, outside of remote device 100, into a carrier compatible with floppy disc or Iomega ports on remote computer 106.

Control module 101 collects the sampled data from BVM 103 and verifies user identity based on biometric reference data stored in memory 105, or RAM 206 (FIG. 2A), or in memory internal to BVM 103. Control module 101 stores the geographic co-ordinates at the time of initiation (for example, longitude, latitude, altitude, and time of remote device 100 as determined by Location Module 102. In addition to these variables, the I.D. Status (user VERIFIED or user NON-VERIFIED), as determined by BVM 103 and the ID number of the user are the final entries in the generated data stored in the Information Carrier 105. The I.D. Status, ID number, the three geographic coordinates, and the time of the measurements (substantially at the time of initiation) placed in storage in the Information Carrier 105 constitutes a transaction cycle of Remote device 100.

In most cases, the transaction cycle is completed even for a NON-VERIFIED I.D. Status. The reason for this is that useful information can still be collected from such a transaction cycle. In one aspect of the present invention, the current biometric characteristics are also stored for the NON-VERIFIED case in order to establish an evidence trail.

Each variable, of a normal transaction cycle, corresponds to a data log. There are typically six data logs in each such regular transaction cycle.

In one aspect of the present invention, computing system 106 operations are performed internal to Remote device 100. In such a configuration, the result of processing the necessary set of transactions (such as a monthly salary check) will also be stored in the Information Carrier 105, in addition to the other "raw" generated data. Physical paychecks in such a system could be printed using a network (or stand-alone) printer connected to Remote device 100 through Network interface 113 and controlled and formatted by CPU 101A. Individual transaction cycles in such a system represent the "raw" data that supports the results in the end process and the "raw" data may be sent to computing system 106 for storage to avoid potential disputes regarding employee paychecks or otherwise.

Control module 101 also controls distribution of power from power module 104 to other modules of remote device 100 and where applicable and, either through USB connector 111 or any other means, assists in data transfer from remote device 100 to computing system 106.

Control Module 101A sets and stores parameters for storing a data log. One such log is created when BVM 103 produces a matching score based on the comparison of a user's identity and reference biometric parameters stored in memory 105, described below as user VERIFIED ("go")

condition or NON-VERIFIED ("no-go") condition depending upon whether the matching score is above or below a pre-defined threshold value.

Control module 101 stores the location coordinates and, in certain aspects, the time of location measurement received from location module 102 along with the certified Identity Status and the ID number of the user in memory 105. Where applicable, the data log may be formatted depending upon how the data is used by computing system 106.

Where applicable, data from memory 105 is transmitted to computing system 106 under the control of control module 101 using plural means. For example, radio means, cell phone, WI-FI standard (incorporated herein in its entirety by incorporation), BLUETOOTH standard (incorporated herein in its entirety by incorporation), Internet communication as described below or using a USB cable (not shown) via USB connector 111.

Figure 1E:
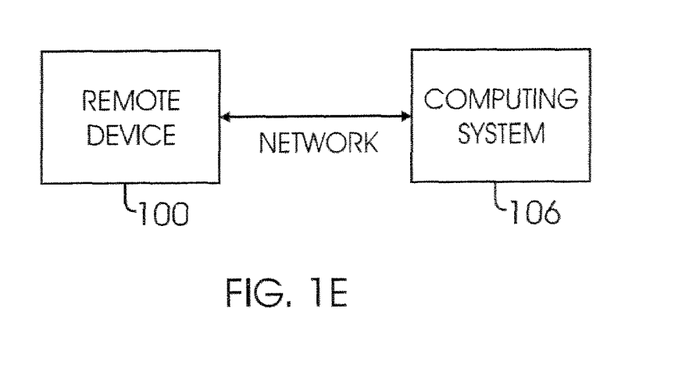
FIGS. 1E and 1F show block diagrams of the remote device of FIGS. 1A, 1C and 1D transferring data to a computing system, according to one aspect of the present invention.
Figure 1F:
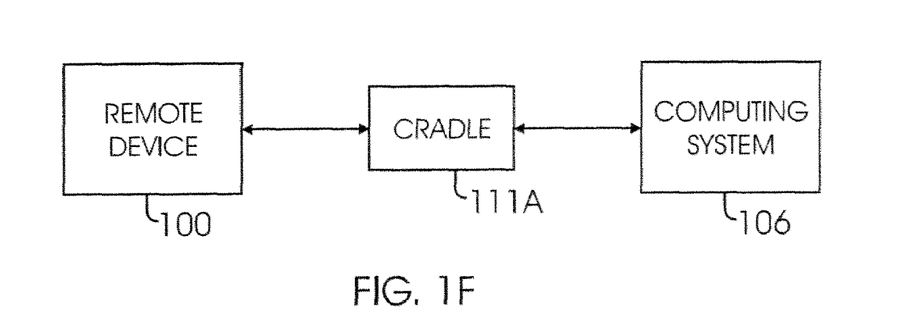

FIG. 1E shows remote device 100 transferring information to computing system 106 via a network connection. FIG. 1F shows transfer of information using a "cradle" 111A to transfer information from remote device 100. Cradle 111A can be USB enabled or any other interface compliant.

Memory 105 as used herein is an "information carrier", rather just a memory storage device. The type of market sector will determine the type of memory 105. For example, remote device 100 may be used in a sector that needs real-time communication or data may be transmitted off-line on a consistent basis. For example, for a payroll system, data may be needed once a week or twice a month depending upon when payroll is processed. In this case USB connector 111 may be used to transfer data from remote device 100 to computing system 106.

If real-time communication is not required, then remote device 100 does not need wireless access or an Internet connection and hence that substantially reduces the overall cost of remote device 100.

Memory 105 may be a flash memory card/stick. CPU 101A can encrypt data stored on memory 105. A PCMCIA encryption card may also be used to protect data on memory 105. This prevents users from tampering with data that is stored in memory 105. A comparable encryption program/card may be used in computing system 106 to maintain data security.

FIG. 1D shows yet another block diagram of remote device 100 showing certain product descriptions for the various components that can be used in the various adaptive aspects of the present invention. The product names/numbers are not intended to limit the present invention, but only to illustrate the adaptive aspects of the present invention.

As shown in FIG. 1D, location module 102 may be a global positioning system ("GPS") unit, for example, the LEADTEK 9546 MODULE (SRF STAR II)™ sold by LEADTEK Corp. BVM 103 may include Model 5$^{th}$ SENSE SCANNER AND Model CONFORMA PROTECTA (software and firmware) sold and marketed by VERIDICOM Inc. Memory 105 may be SANDISK SDCFB-256768 sold by SANDISK CORPORATION™ that is often used for digital cameras.

Control module 101 includes dedicated logic, or a microcontroller 101A (or CPU microprocessor), or an embedded circuit equivalent of a micro-controller and may be provided with flash memory 101C for program storage and RAM 101D, as described below. Control module 101 may also be provided with an input/output buffer 101F and buffer selector 101H that interfaces with a byte selector 101G for transferring information into and out of control module 101.

In certain implementations, BVM 103 receives identification number 103A from control module 101 and BVM 103 sends the IDENTITY STATUS and the Current Extracted Biometric Characteristics of the user back to control module 101 for the data log, of that transaction cycle. In other implementations, BVM 103 can distinguish between different users of the same remote device 100. This is accomplished by using several sets of Reference Biometric Characteristics, each of which is associated with a unique ID number. These Reference Biometric Characteristics are accessed during a "circulating" comparison of the Current Biometric Characteristics, of the particular user, ascertained by a captured scan of the field of the user, against each of the Reference Biometric Characteristics. The comparison with the highest degree of similarity, above a threshold, is the winning "match" and the associated ID number, with that particular set of Reference Biometric Characteristics, is the ID number used in the transaction. Typically this technique is employed for no more than ten users in the Reference Sets.

In either case, the complete Transaction Data is then sent to memory 105 via 105A connection. Location information 102A is received from location module 102. Encrypted data log 105A created by using encrypting module 101E is stored in memory 105. Data 101B can be transferred to Computer 106 via USB connector 111.

In one aspect of the present invention, to prevent abuse and unauthorized use, secured biometric authentication is additionally performed externally with respect to remote device 100. After a positive verification by remote device 100, user identity and related biometric information is sent to computer 106. In this instance, computer 106 may also have a separate set of Reference Biometric Characteristics and is used to perform a second identity verification test.

Power module 104 is coupled to control module 101 in order to control power distribution to other components.

Control module 101 is coupled to an amplifier 211 that is coupled to signal lamp 110 that flashes at pre-programmed intervals or if the user goes beyond a certain threshold distance.

Figure 2A:
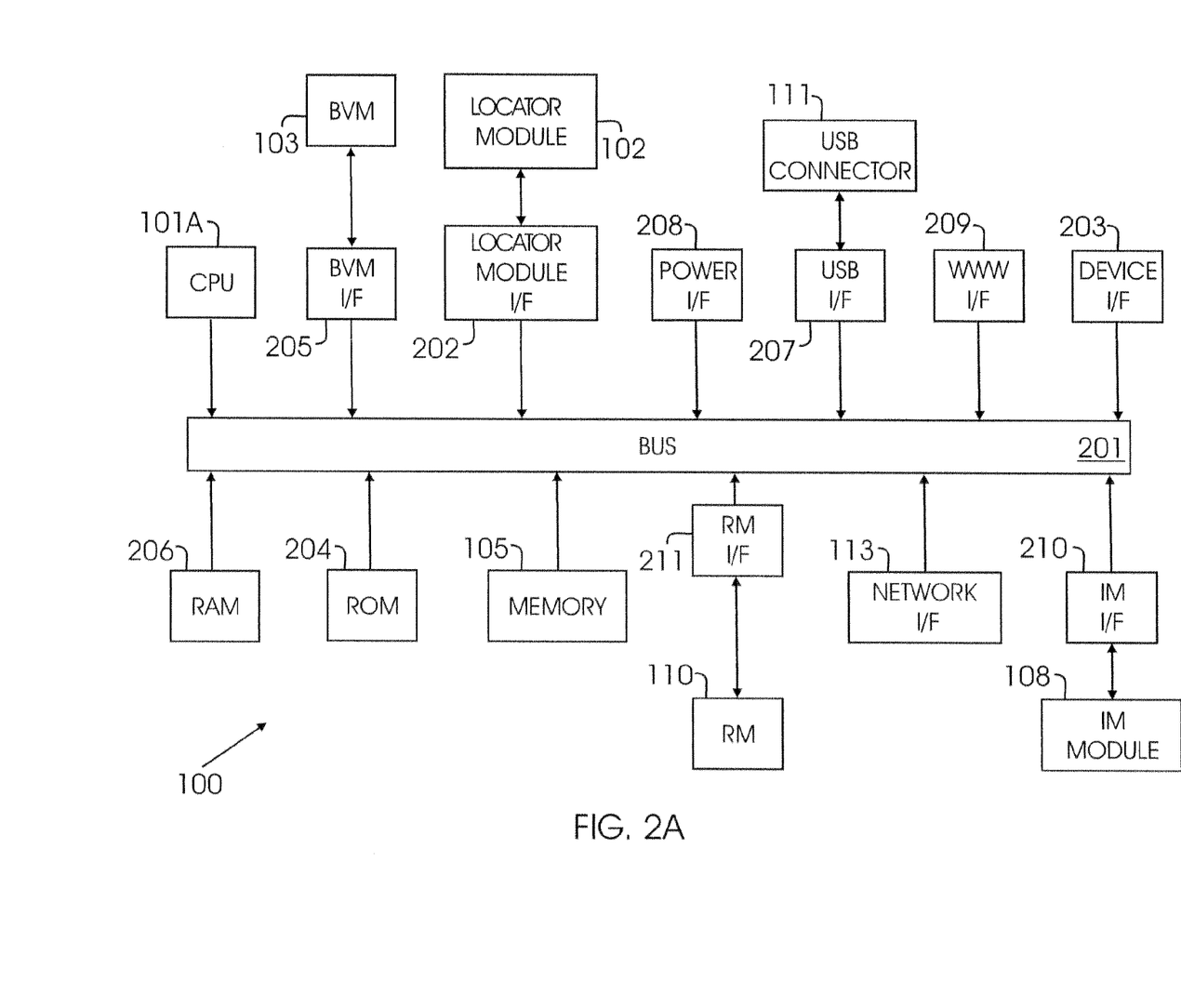
FIG. 2A shows the internal architecture of the remote device in FIGS. 1A, 1C and 1D, according to one aspect of the present invention.

Block Diagram of Internal Architecture of Remote Device 100:

FIG. 2A is a block diagram showing the internal functional architecture of remote device 100. As shown in FIG. 2A, remote 100 includes a processor/control module/central processing unit ("CPU") 101A that interfaces with various components using bus 201 described below and is used for executing computer-executable process steps including those discussed above and below, according to one aspect of the present invention. CPU 101A is a part of control module 101 that is described above.

CPU 101A interfaces with BVM 103 through biometrics module interface 205 to verify the identity of the user. In one aspect of the present invention, interface 205 is integrated with BVM 103.

BVM 103 scans a defined biometrics sensitive area (for example, a thumb print) of a user to create real-time biometric characteristics. BVM 103 receives a set of reference biometric characteristics from CPU 101A that may be stored in RAM 206 or memory 105 or accessed remotely from a secured network. The reference biometric characteristics are compared to the scanned characteristics to generate a matching score. In one aspect, a go/no-go limit may be programmed to accept or reject the identity of the remote device 100 users. In another aspect Remote 100 may contain more than one set of Reference Biometric Characteristics. Each set will refer to a different individual user. In this case, BVM 103 will be configured to go through a fast identification process that compares, when necessary, the current Extracted Biometric Characteristics of the user against all Reference Sets and produces a "GO" (user verified) Identity Status for the comparison with the highest degree of similarity, above a preprogrammed Threshold.

In one aspect of the present invention, if a no-go condition (user not verified) exists; remote device 100 still logs the location information but highlights the absence of positive identification. Remote device 100 stores the biometric information of an authorized user and in certain aspects may store the characteristic biometric information of several authorized users. This information may be used to track the perpetrator of the unauthorized transaction.

As discussed above, the Reference Biometric Characteristics are may be stored in memory 105 or alternatively in BVM 103. The Reference Biometric Characteristics are based on an enrollment program, internal or external to remote device 100. USB connector 111 may be used to communicate with an external Reference Generator to create an optimal set of Reference Characteristics. Computing system 106 may also operate as a remote Reference Generator.

Reference Characteristics are typically developed by scanning a chosen biometric area (for example, a thumb or index finger). The biometric enrollment program is a computer program (running in computing system 106 and/or remote device 100 and/or BVM 103) that uses the biometric scanner, integral to the remote device 100 and associated with BVM 103, for imaging the biometric area.

In one aspect of the present invention, the computer program/routine produces a reduced set of Biometric Characteristics based on "raw" data that is captured by BVM 103. The reduced set of characteristics may be used to produce an optimal set of Reference Characteristics. This is achieved by analyzing the most repeatable biometric data in multiple scans of the chosen biometric area. The computer program assigns scores, arranged in a hierarchy that is based on the average number of times a particular feature repeats itself. This is used to define the threshold limit for defining the boundary between user VERIFIED and user NOT-VERIFIED condition.

In terms of numbers of installations, Fixed Station configurations, used in automatic Time-Clocking, are the most prevalent systems. They have generally utilized hand geometry-based biometrics typified by no more than nine describing variables, each of two dimensions. In the preferred embodiment of the present invention, a live fingerprint Verification System integral to remote device 100 is employed. Such systems "see" many more describing variables than hand geometry. Typically, there are thirty variables with three dimensions each, to uniquely characterize individuals. Because of this substantially increased number of variables, fingerprint systems are typically more robust and accurate.

In addition, Fingerprint Verification allows an enormous compaction in the physical size of the scanner, as opposed to that of hand geometry, and most other biometric types.

CPU 101A also interfaces with location module 102 through location module interface 202. In one aspect of the present invention, interface 202 is integrated with location module 102.

Location module 102 may be a GPS satellite supported locator that outputs latitude, longitude, altitude and the time data is received. A two-stage GPS-phase delay assist system may also be used by locator module 102 to provide the location of remote device 100 relative to the location of a central unit (not shown) containing GPS data for the central unit. The central unit has a radio transmitter/receiver that enables a measurement of the range distance between remote device 100 and the central unit. The range is calculated from the time (phase) delay between a continually broadcast low frequency signal from Remote 100 and the radio signal received by and then relayed back from the central unit. This system is similar to techniques currently used by some cell phone suppliers (for example, by VERIZON™) where the central unit is in a microwave tower.

Location module 102 may also use a system similar to house arrest electronic monitoring system (not shown) that uses a miniature transmitter locked around say an offender's ankle. The device communicates with a modem (not shown) attached to a telephone (not shown) and the modem determines the distance from the transmitter to the modem by similar phase difference technique.

A random access main memory ("RAM") 206 also interfaces with CPU 101A to provide CPU 101A with an electronic area in which to perform necessary calculations. When executing stored computer-executable process steps CPU 101A stores intermediary process steps in RAM 206 and executes the final results through BUS 201.

Read only memory ('ROM") 204 is provided to store invariant instruction sequences such as start-up instruction sequences, transaction forming sequences, or basic Input/output operating system (BIOS) sequences.

CPU 101A is coupled to USB connector 111 via interface 207, allowing USB connectivity to remote device 100. CPU 101A also interfaces with device interface 203 that allows remote device 200 to be connected to another computing device 106 using any other interface, for example, IEEE 1394, incorporated herein by reference in its entirety.

CPU 101A is coupled to a power module interface 208 that allows remote device 100 the power to operate. CPU 101A controls the overall distribution/allocation of power for the individual modules.

CPU 101A is also coupled, via the bus, to a reminder module Interface RM 211 that is coupled to RM 110. RM 110 as described above with respect to FIG. 1C may remind a user to verify identity.

CPU 101A, or the dedicated logic equivalent, is also coupled, via 201, to initiating module interface 210 that is coupled to IM 108. Engagement of IM 108 causes BVM 103 to verify the user's identity. This is the first operation performed in the start of a new transaction cycle. Certain biometric devices perform the engagement function, for example, the proper insertion of thumb or index finger of a user onto the integral scanner, automatically initiates the scan of the finger, the activation of BVM 103 and the start of a transaction cycle.

Remote device 100 may include a network interface 113 that may be a modem, network interface or a unit for providing connectivity to other computer systems over a network using protocols such as X.25, Ethernet or TCP/IP, or any device that allows, directly or indirectly, computer-to-computer communications. A World Wide Web ("WWW") interface 209 has been shown separately to illustrate connectivity between remote device 100 and the Internet; however, WWW I/F may be a part of network interface 113.

Information from remote device 100 may be transmitted to computing system 106 using the Internet. The following provides a brief description of the Internet.

The Internet:

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Computing System 106:

To facilitate an understanding of the preferred embodiment, the general architecture and operation of a computer system will now be described.

FIG. 1B is a block diagram of computing system 106 used according to one aspect of the present invention. FIG. 1B includes a host computer 106 and a monitor 11. Monitor 11 may be a CRT type, a LCD type, or any other type of color or monochrome display. Also provided with computer 106 are a keyboard 13 for entering data and user commands, and a pointing device 14 for processing objects displayed on monitor 11.

Computer 106 includes a computer-readable memory medium such as a rotating disk 15 for storing readable data. Besides other programs, disk 15 can store application programs including web browsers by which computer 106 connects to the Internet and processing module 106A.

According to one aspect of the present invention, computer 106 can also access computer-readable floppy disks storing data files, application program files, and computer executable process steps (for example, processing module 106A) embodying the present invention or the like via a floppy disk drive 16. A CD-ROM, or CD R/W (read/write) interface (not shown) may also be provided with computer 106 to access application program files, audio files and data files stored on a CD-ROM.

A modem, an integrated services digital network (ISDN) connection, or the like also provides computer 106 with an Internet connection 12 (or any other network) to the World Wide Web (WWW). The Internet connection 12 allows computer 106 to download data from remote device 100, application program files and computer-executable process steps embodying the present invention.

It is noteworthy that the present invention is not limited to the FIG. 1B architecture. For example, notebook or laptop computers, handheld devices, set-top boxes or any other system capable of running computer-executable process steps, as described below, may be used to implement the various aspects of the present invention.

Figure 2B:
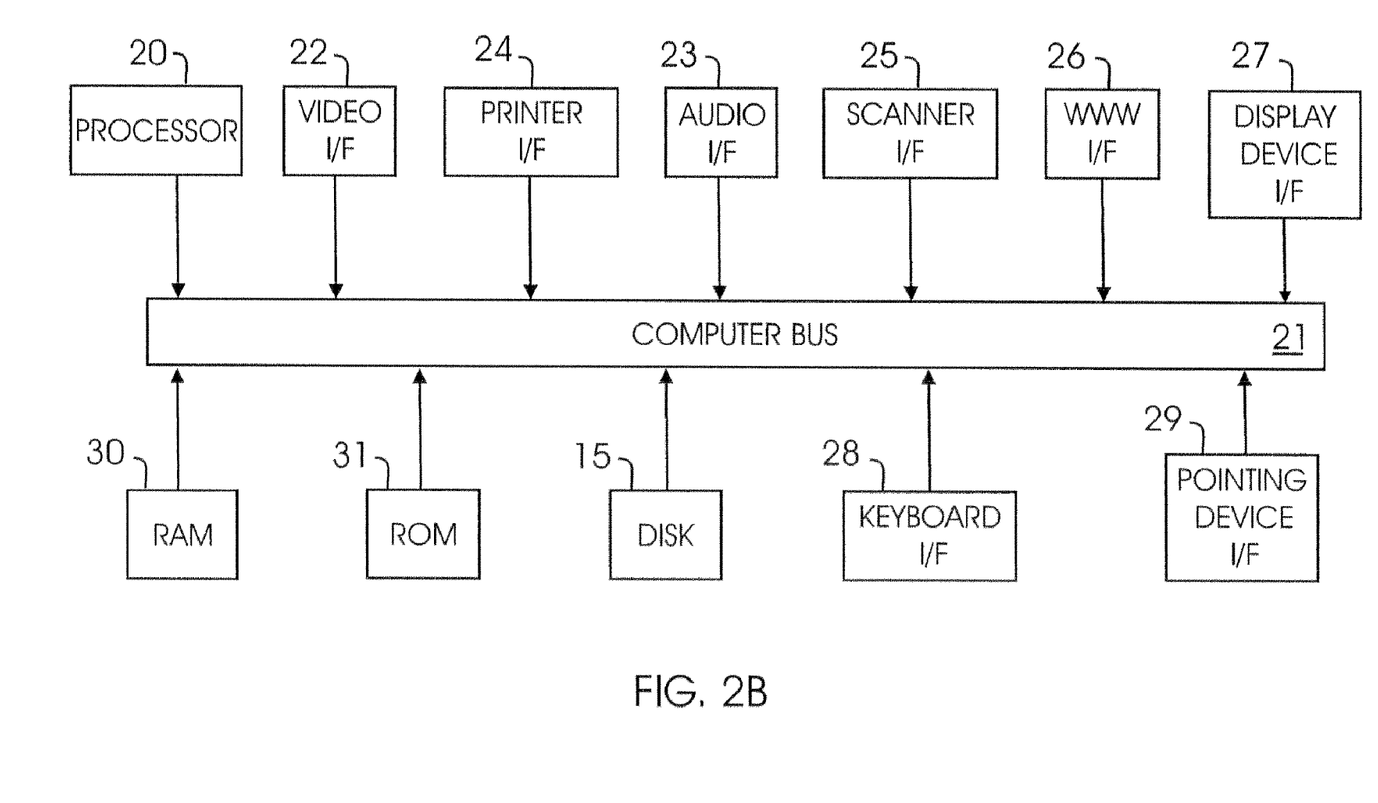
FIG. 2B shows the internal architecture of the computing system in FIG. 1B.

FIG. 2B is a block diagram showing the internal functional architecture of computer 106. As shown in FIG. 2A, computer 106 includes a processor 20 for executing computer-executable process steps and interfaces with a computer bus 21. Also shown in FIG. 2 are a video interface 22, an audio interface 23, a printer interface 24, a scanner interface 25, a WWW interface 26, a display device interface 27, a keyboard interface 28, a pointing device interface 29, and a disk 15.

Audio interface 23 allows a listener to audio files, and video interface 22 allows a user to access video. Printer interface 24 and scanner interface 25 provide computer 106 with connectivity to a scanner and printer (not shown).

Figure 1G:
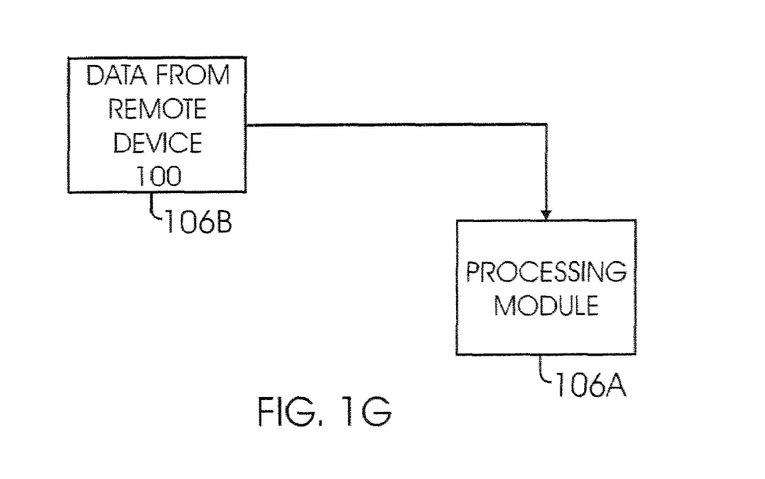
FIG. 1G shows data from remote device 100 sent to a processing module, according to one aspect of the present invention.

As described above, disk 15 stores operating system program files, application program files (for example processing module 106A, web browsers, and other files. Some of these files are stored on disk 15 using an installation program. For example, processor 20 executes computer-executable process steps of an installation program so that processing 20 can properly execute processing module 106A shown in FIG. 1G.

Random access memory ("RAM") 30 also interfaces to computer bus 21 to provide processor 20 with access to memory storage. When executing stored computer-executable process steps from disk 15 (or other storage media such as floppy disk 16 or WWW connection 12), processor 20 stores and executes the process steps out of RAM 30.

Read only memory ("ROM") 31 is provided to store invariant instruction sequences such as start-up instruction sequences or basic input/output operating system (BIOS) sequences for operation of keyboard 13.

Figure 3:
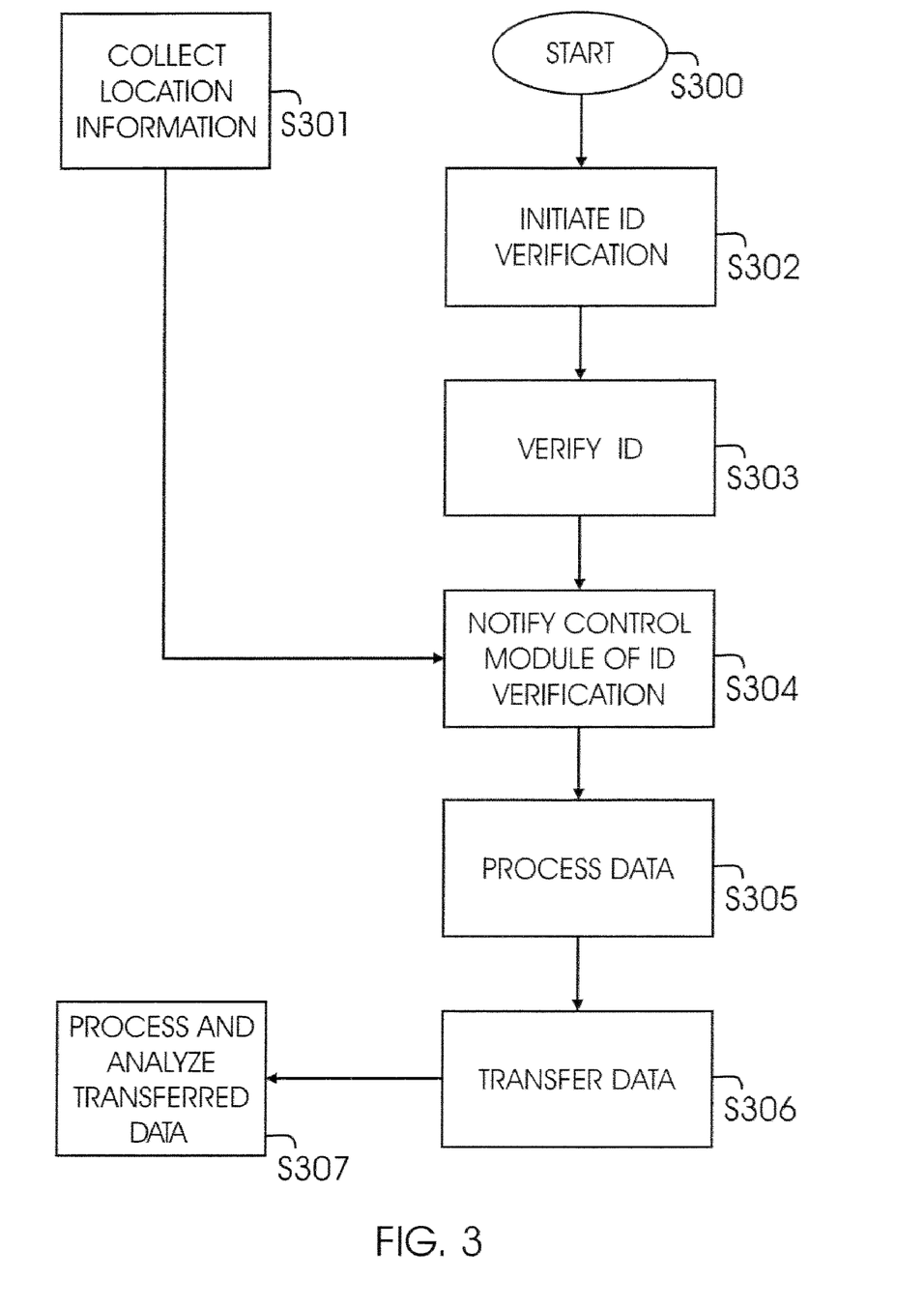
FIG. 3 shows a process flow diagram, according to one aspect of the present invention.

Process Flow:

FIG. 3 provides a flow diagram of process steps, according to one aspect of the present invention to collect for monitoring individual movement.

In step S300, the process starts. In step S302, the process initiates a user's identification. In one aspect this occurs when signal lamp 110 flashes either at pre-programmed interval, if a user goes beyond or within a certain location, or any other event.

In step S303, the process verifies the identification of the user. In the preferred embodiment, live finger printing is used to verify identity. BVM 103 receives user ID number 103A and matches the Reference Biometric Characteristics with BVM 103 data. The Reference Biometric Characteristics may be stored internal to BVM 103 or in RAM 206.

In step S304, the process notifies control module 101 of the status of identity verification and the location of remote device 100 via 102A, as captured by location module 102. The data may be secured and stored in memory 105. In one aspect, location module 102 captures remote device information on a regular basis, as shown in step S301.

In step S305, collected data 102A is processed. If a positive match did not occur in step S303, control module 101 still logs ID Number, the location and time with an ID Status of "NO-GO".

In step S306, processed data 106B is transferred to processing module 106A that operates in computing system 106. Transfer of data occurs using a network (FIG. 1E) or an interface, for example, USB (FIG. 1F).

In step S307, processing module 106A processes data 101B received from remote device 100. Processing module 106A can include a payroll system that extracts data 101B to determine whether an employee was working or not and hence adjust the employee's payroll accordingly. The information is also used to evaluate overall employee performance and may be used to make organizational changes. Furthermore, information 101B may also be used to track fraud, if there was no positive identification in step S303.

In one aspect of the present invention, a robust, easy to use and accurate remote monitoring device is provided for monitoring individuals. In this connection, the integral biometric verification device assures the identity of the person being monitored.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A handheld portable device for biometrically verifying user identity and monitoring user movement, comprising:
    an initiation module, activated by a biometric capture action, initiates the portable device for receiving biometric information of the user to begin a transaction cycle without having the user enter any other information; wherein, at a time of initiation by the biometric capture action, the portable device records the user's geographic location, a time of the geographic location measurement, and a status indicating whether user's identity was biometrically verified for the transaction in an information carrier;
    a biometric verification module ("BVM") that compares the biometric information received immediately after initiation with reference biometric characteristic information of the user stored in the portable device, without requiring the user to enter an identification number;
    wherein the reference biometric characteristic information is captured by the portable device during an enrollment process such that the user is authorized to use the portable device and the portable device is used to identify the user by using biometric information;
    wherein the BVM module includes a finger print scanner for capturing images of a relevant biometric finger print area for the transaction cycle; and
    wherein after the comparison, the BVM module indicates whether the user's identity is verified or not; and
    a location module that determines the portable device's location information and the time of measurement for the transaction cycle; and after the biometric user identity verification, the location module continuously monitors the portable device location to detect if a user has traveled beyond a programmed threshold value;
    wherein the information carrier is a memory card that stores (i) the reference biometric characteristic information, and (ii) for the transaction cycle, stores the geographic location, the time of measurement of location, a user identity status indicating whether the user identity was verified or not; and a user identity flag; and such information is maintained in the information carrier even when the portable device is powered off;
    wherein one portable device is dedicated to each user for biometrically verifying the user's identity and monitoring user movement by tracking the movement of the portable device;
    wherein information collected for the transaction cycle is used in a data log that is used for user payroll processing; and
    wherein the portable device collects information for the transaction cycle even if the BVM module indicates that the user's identity could not be biometrically verified and the collected information is highlighted in the data log associated with the transaction cycle showing a non-verified status.

2. The portable device of claim 1, wherein the portable device is lightweight, remote and cellular phone size.

3. The portable device of claim 2, further comprising:
    a dedicated logic pathway between the biometric verification module, the location module, and the information carrier; wherein the portable device transmits stored data from the information carrier to an external computing system that processes the data.

4. The portable device of claim 3, further comprising:
    an internal processor for programming the portable device to process the data to a common digital format for storing the data in the information carrier and control type and flow of data from the portable device to the computing system; wherein the processor is programmed remotely.

5. The portable device of claim 4, wherein the processor executes programmable steps to process the data to achieve a result similar to that achieved by an external computing system.

6. The portable device of claim 4, wherein the portable device transfers the data by using one or more of (a) a Universal Serial Bus ("USB") connector on the portable device to the computing system using a USB cable, (b) by physically inserting the Information carrier in a slot on the computing system; (c) via Internet and (d) radio means.

7. The device of claim 3, further comprising:
    a reminder module that signals the user by exciting one or more of user senses to initiate the transaction cycle and a transfer of a complete set of data entry into the information carrier, wherein the reminder module activation can be pre-programmed.

8. The portable device of claim 7, wherein the reminder module is activated at pre-programmed intervals and if a current location of a user exceeds a threshold distance from an expected location.

9. The portable device of claim 7, wherein the reminder module is programmed and re-programmed remotely.

10. The portable device of claim 7, wherein the reminder module generates an audio signal and a visual signal to remind the user to initiate a verification action.

11. The portable device of claim 10, wherein the location module uses global positioning satellite technology.

12. A method for monitoring a user using a portable device that is assigned and dedicated to the user, comprising:
    (a) initializing the portable device for capturing biometric information of the user to begin a transaction cycle, without having the user enter an identification number;
    (b) biometrically verifying user identity, wherein the dedicated portable device compares the captured biometric information from step (a) with user specific biometric reference information stored within the portable device; wherein the user specific biometric reference information is captured during an enrollment process for biometrically identifying the user after the enrollment process;
    (c) determining a geographic location and a time of measurement of such location for the transaction cycle;
    (d) continuously monitoring the portable device location, after user identity is biometrically verified or not; and
    (e) storing an indicator indicating whether user identity was biometrically verified in step (b), the geographic location and the time of measurement from step (c), and a user identity flag for the transaction cycle in an information carrier, wherein such data is maintained in the information carrier even when the portable device is powered off;

wherein information collected for the transaction cycle is used in a data log that is used for user payroll processing; and wherein the portable device collects information for the transaction cycle in steps (c), (d) and (e) even if the user's identity could not be biometrically verified in step (b) and the collected information is highlighted in the data log associated with the transaction cycle showing a non-verified status.

13. The method of claim 12, wherein a biometric verification module ("BVM") verifies the user's identity and includes a finger print scanner for capturing images of a relevant biometric area and compares the captured images with pre-defined and stored reference biometric characteristics, wherein after the comparison, the BVM indicates whether the user's identity is verified or not.

14. The method of claim 12, wherein a location module determines the portable device's location information and the time of measurement and continuously monitors portable device location.

15. The method of claim 12, wherein an initiation module initiates user identity verification and data collection.

16. The method of claim 12, wherein an internal processor programs the portable device to process data to a common digital format for storing the data in the information carrier and control type and flow of data from the portable device to a computing system; wherein the processor is programmed remotely.

17. The method of claim 12, wherein a reminder module signals the user by exciting one or more of user senses to initiate the transaction cycle and a transfer of a complete set of data entry into the information carrier, wherein the reminder module activation is pre-programmed.

18. A handheld and cell phone type portable device for biometrically verifying user identity and monitoring user movement, comprising:

an initiation module, activated by a biometric capture action, for initiating the portable device for capturing biometric information of the user to begin a transaction cycle without requiring the user to enter a user identity number; and at a time of initiation by the biometric capture action, collecting and storing information determined within the transaction cycle; wherein such information is used for user payroll processing, or for a security application;

a biometric verification module ("BVM") for capturing biometric information of a relevant biometric area after the portable device is initiated by the initiation module;

wherein the BVM compares the captured biometric information with pre-defined reference biometric characteristic information stored within the portable device; and indicates whether the user's identity is verified for the transaction cycle, without having the user to enter an identity number; and wherein the pre-defined reference biometric characteristic information is captured during an enrollment process such that the user is authorized to use the portable device and the portable device is used to identify the user by using biometric information;

a location module that determines the portable device's geographic location information and a time of measurement; and after biometric user identity verification, the location module continuously monitors the portable device location to detect if a user has traveled beyond a programmed threshold value;

a memory module for storing the pre-defined reference biometric characteristic information, the geographic location, the time of measurement of the geographic location for the transaction cycle and a status of whether the user was biometrically identified by the BVM; and a reminder module that signals the user by exciting one or more of user senses to initiate the transaction cycle and a transfer of stored data in the memory module; wherein the portable device is dedicated and assigned to one user.

19. The portable device of claim 18, wherein the reminder module is pre-programmed to remind the user to initiate a data transfer action.

20. A portable device, comprising:

an initiation module, activated by a biometric capture action, for initiating the portable device for capturing biometric information of the user to begin a transaction cycle, without requiring the user to enter a user identity number; and at a time of initiation by the biometric capture action, collecting and storing information within the transaction cycle;

a biometric verification module ("BVM") for capturing biometric information of a relevant biometric area after the portable device is initiated by the initiation module;

wherein the BVM compares the captured biometric information with pre-defined reference biometric characteristic information stored within the portable device; and indicates whether the user's identity is verified for the transaction cycle, without having the user to enter an identity number; and wherein the pre-defined reference biometric characteristic information is captured during an enrollment process such that the user is authorized to use the portable device and the portable device is used to identify the user by using biometric information;

a location module that determines the portable device's geographic location information and a time of measurement; and after biometric user identity verification, the location module continuously monitors the portable device location to detect if a user has traveled beyond a programmed threshold value;

a memory module for storing the pre-defined reference biometric characteristic information, the geographic location, the time of measurement of the geographic location for the transaction cycle and a status of whether the user was biometrically identified by the BVM; and a reminder module that signals the user by exciting one or more of user senses to initiate the transaction cycle and a transfer of stored data in the memory module.

21. The portable device of claim 20, wherein the reminder module is pre-programmed to remind the user to initiate a data transfer action.

22. The portable device of claim 20, wherein the portable device is lightweight, remote and cellular phone size.

* * * * *